United States Patent
Burgsmueller et al.

(10) Patent No.: US 10,821,631 B2
(45) Date of Patent: Nov. 3, 2020

(54) FREE-FLOWING PRESSURE SENSITIVE ADHESIVES

(71) Applicant: HENKEL AG & CO. KGAA, Duesseldorf (DE)

(72) Inventors: Milan Burgsmueller, Muehlheim (DE); David Duckworth, Blackburn (GB); Gerald Petry, Hueckelhoven (DE); Gunther Kratz, Langenfeld (DE); Eckhard Puerkner, Duesseldorf (DE)

(73) Assignee: HENKEL AG & CO. KGAA, Duesseldorf (DE)

( * ) Notice: Subject to any disclaimer, the term of this patent is extended or adjusted under 35 U.S.C. 154(b) by 3 days.

(21) Appl. No.: 14/568,164

(22) Filed: Dec. 12, 2014

(65) Prior Publication Data

US 2015/0091202 A1    Apr. 2, 2015

Related U.S. Application Data

(60) Division of application No. 13/757,923, filed on Feb. 4, 2013, now abandoned, which is a continuation of application No. PCT/EP2011/062508, filed on Jul. 21, 2011.

(30) Foreign Application Priority Data

Aug. 4, 2010  (EP) .................................. 10171866

(51) Int. Cl.
| | |
|---|---|
| *B29B 9/06* | (2006.01) |
| *B29C 48/21* | (2019.01) |
| *B01J 2/30* | (2006.01) |
| *C09J 9/00* | (2006.01) |
| *B29B 9/12* | (2006.01) |
| *B29K 105/00* | (2006.01) |
| *B29K 101/12* | (2006.01) |

(52) U.S. Cl.
CPC ................ *B29B 9/065* (2013.01); *B01J 2/30* (2013.01); *B29B 9/12* (2013.01); *B29C 48/21* (2019.02); *C09J 9/00* (2013.01); *B29K 2101/12* (2013.01); *B29K 2105/0038* (2013.01); *B29K 2105/0097* (2013.01)

(58) Field of Classification Search
CPC ............ B29C 47/04–068; C09J 123/06; C09J 123/16; C09J 7/25; C09J 109/06–08; C09J 125/08–10
See application file for complete search history.

(56) References Cited

U.S. PATENT DOCUMENTS

| | | | | |
|---|---|---|---|---|
| 3,896,069 | A | * 7/1975 | Kosaka | C09J 123/08 524/271 |
| 5,373,682 | A | 12/1994 | Hatfield et al. | |
| 5,378,089 | A | 1/1995 | Law | |
| 6,120,899 | A | * 9/2000 | Cameron | C08J 3/124 428/407 |
| 6,143,206 | A | * 11/2000 | Handa | H01C 7/027 219/541 |
| 6,238,732 | B1 | 5/2001 | Cameron et al. | |
| 6,430,898 | B1 | * 8/2002 | Remmers | B29B 13/022 53/140 |
| 6,669,986 | B1 | * 12/2003 | Mushiake | B29B 9/06 264/143 |
| 6,716,527 | B1 | 4/2004 | Czmok et al. | |
| 6,872,279 | B1 | 3/2005 | Kolowrot et al. | |
| 7,268,178 | B2 | 9/2007 | Frei | |
| 7,328,547 | B2 | 2/2008 | Mehta et al. | |
| 2003/0190467 | A1 | 10/2003 | Husemann et al. | |
| 2009/0270540 | A1 | 10/2009 | Tonniessen et al. | |

FOREIGN PATENT DOCUMENTS

| | | | | |
|---|---|---|---|---|
| CA | 1267517 A | * 4/1990 | ......... | B29C 47/0011 |
| EP | 0451920 A2 | 10/1991 | | |
| EP | 0469564 A1 | 2/1992 | | |
| EP | 0557573 A2 | 9/1993 | | |
| EP | 0957029 A1 | 11/1999 | | |
| JP | 2002-509944 A | 4/2002 | | |
| JP | 2004314516 A | 11/2004 | | |
| JP | 2002338933 A | 7/2005 | | |
| JP | 2005199706 A | 7/2005 | | |
| WO | WO-0146019 A1 | * 6/2001 | ....... | C09D 123/0815 |
| WO | 2006050108 A1 | 5/2006 | | |

OTHER PUBLICATIONS

Optimization of temperatures across extruder is essential to reduce stress to polymer melt. Plastemart. http://www.plastemart.com/upload/Literature/Optimization-of-temperatures-extruder-reduce-stress-polymer-melt.asp. As viewed on Oct. 12, 2008.*
LDPE. Polymers: A Property Database. CHEMnetBASE. http://www.chemnetbase.com/. CRC Press, Taylor and Francis Group, LLC. As viewed on Feb. 29, 2016.*

* cited by examiner

*Primary Examiner* — Stephen E Reith
(74) *Attorney, Agent, or Firm* — Sun Hee Lehmann

(57) ABSTRACT

The invention relates to hot melt adhesives which are pressure sensitive adhesives whereby the adhesive is provided in a granulated form and is free-flowing and does not block during storage. Such pellets can be used as feed for automated feeder devices for the supply hot melt application systems.

5 Claims, No Drawings

FREE-FLOWING PRESSURE SENSITIVE ADHESIVES

CROSS-REFERENCE TO RELATED APPLICATIONS

This application is a divisional of U.S. application Ser. No. 13/757,923 filed Feb. 4, 2013, which claims the benefit of International Application No. PCT/EP2011/062508 filed Jul. 21, 2011, which claims the benefit of European Application No. 10171866.6 filed on Aug. 4, 2010, and the contents of all of which are incorporated herein by reference.

FIELD OF THE INVENTION

The invention relates to hot melt adhesives which are pressure sensitive adhesives whereby the adhesive is provided in a granulated form and is free-flowing and does not block during storage.

BACKGROUND OF THE INVENTION

Thermoplastic adhesives, especially hot melts, can be manufactured and packaged as disclosed in EP 0469564. According to this document a hot melt adhesive is formed as separate portion, solidified and thereafter this portion is surrounded by a plastic packaging material. The plastic packaging material shall be meltable with the adhesive. The range of the pillow-shaped portions disclosed is from about 100 g to about 4 kg.

In order to reduce the tendency of the individual pillows to stick and adhere to each other, it is known to coat them with a separating, anti-stick substance, as disclosed in U.S. Pat. No. 7,328,547. The anti-stick substance is disclosed as film forming material containing at least 25% wax. The adhesive can be manufactured for example in a co-extrusion process. No specific form of the adhesive as delivered is disclosed.

EP 0957029 discloses a process to manufacture coated portions of an adhesive by co-extrusion. The polymer is provided in molten form and during the extrusion process an outward coating is applied. No information of specific compositions of the adhesive or coating material is provided.

EP 1196509 discloses a method to form granulated hot melt adhesives. This granulate is cooled to a non sticky form. Thereafter the adhesive material is coated with an ingredient of such adhesive in a liquid form which is non sticky as solid material and shall form an outside coating on such granulates. Such granulates a disclosed as free flowing.

U.S. Pat. No. 6,238,732 discloses a process to manufacture pellets of a pressure sensitive adhesive whereby the pellets are covered with coating of a non-blocking ingredient of the adhesive. As components to form the coating powders or solutions and dispersions are disclosed.

The prior art teaches the possibility to coat larger portions of a hot melt adhesive with a plastic coating. Such coatings are required for packaging pressure sensitive adhesives which by way of their use shall provide permanent tacky surfaces. Only with such non-sticky coating the adhesive material can be transported in single portions.

The coating materials as disclosed in the prior art are selected so that they can be mixed with the adhesive and do not negatively impart the adhesive property of the adhesive. In case of a powdery coating material this is easy to apply. But for use of such portions it is required that this coating shall not be damaged during transportation. In case of defects of the shell the portions will adhere and the portions have to be separated before further processing. Also in case of elevated temperature during transportation and storage it has been noticed that coatings are not stable when manufactured of a powder sticking at the surface of the adhesives, and so the parts, blocks or pillows will stick together. So such coatings which are made by application of a powder on the surface of an adhesive do not provide really continuous coatings, they are not stable against friction during the handling and transportation process.

SUMMARY OF THE INVENTION

If the materials are coated with films of a thermoplastic polymer the stability of such coat is higher. But the manufacturing process is complex. As disclosed the packaging process provides pillows or blocks which are handled manually. An automatic feeding process of smaller portions to a melting device is not possible.

Coating of smaller particles is disclosed by using as coating a liquid dispersion which shall form a solid layer on the surface. This puts a strong limitation on the process, as only specific coating materials can be selected limited by the requirement of having a liquid coating as solution or dispersion. The coating process in a liquid form as dispersion is energy consuming. The solvent has to evaporate to get a non sticky surface and the parts have to be moved so that no clogging appears during this step.

As the adhesive is handled in practice manually larger portions of the adhesive are preferred. Such forms of packaging have the disadvantage that a supply of smaller amounts to the application device is not possible. So the actual molten amount of an adhesive in a melting tank to maintain a steady supply of adhesive is relatively large, which leads to thermal stress of the adhesive melt.

Another disadvantage of smaller packaged adhesive portions is based on the form. The relationship of shell volume and core volume requires a higher amount of shell material. So the adhesive after being molten will contain a larger amount of film forming material stemming from the shell of the portions. This may negatively impart the properties of the adhesive.

Consequently there is a need for a supply of supply pressure sensitive adhesives (PSA) hot melt adhesives in form of pellets which shall be supplied in bulk form and can be processed by automatic feeder systems. But the prior art does not provide adhesives or methods to prepare granulated material with a mechanically stable coating, which shows long term non-blocking properties.

So it is an aim for the industry to provide PSA in a granulated form which can be supplied in bulk form. But additionally the adhesive should be provided in a form which can be stored and thereafter automatically transported and fed into the application devices in an application site in appropriate smaller portions. The pellets shall be covered with a non-blocking coating which can be melted together with the adhesive without unfavourably influencing the properties of the adhesive. The coating film shall be homogenously mixable with the adhesive. Additionally the adhesive pellets shall be non-blocking during storage and transportation.

DETAILED DESCRIPTION OF THE INVENTION

The objective of the invention is solved by providing a hot melt pressure sensitive adhesive in form of pellets, such adhesive comprising a core of a pressure sensitive adhesive material comprising at least one polymer selected from polyesters, polyacrylates, polyolefins, polyurethanes, polymers of ethylene/ vinylacetate (EVA), polystyrene blockcopolymers or mixtures, at least one tackifier and optionally additives, the adhesive material having a softening point of 80 to 150° C. and a tacky surface at 25° C., wherein each pellet of adhesive comprising an outer shell of a polymeric film, whereby the film being a non tacky material, the film forming material comprising thermoplastic polymers having a melting point of less than 120° C., each pellet being completely surrounded by the polymeric film, the film is applied as continuous film, so in that the pellets have a non-blocking surface.

Another object of the invention is to provide a process to supply a granulated pressure sensitive adhesive to a melting device, the PSA granulate being covered with a non-tacky continuous coating whereby the granulate is supplied in bulk form and can be transported by a vacuum feeder.

The term pellets shall include particles of small size showing a symmetrical or unsymmetrical form, having a weight of up to 15 g each. The size is less than 25 mm in either direction the lower limit is more than 1 mm. The pellets according to the invention are free flowing at a temperature of less than 45° C. Under free flowing it is understood that a bulk of pellets will be flowing under influence of the gravity through a perpendicular tube at an indicated temperature. The tube shall have a diameter of 10 cm and a length of 50 cm. The pellets are flowing, no clogging, sticking or blocking is observed. The temperature of pellets and tube is the same and is less than 45° C.

Many thermoplastic synthetic polymers can be used in appropriate pressure sensitive materials. These polymers can be blended with other ingredients such as plasticizer, tackifier, oils and other additives, to form a pressure sensitive adhesive (PSA). As main polymer of an adhesive material used in the invention all thermoplastic polymers can be selected which impart pressure sensitive properties to the adhesive and which are compatible with tackifiers, plasticizers and other components to form a substantially homogenous melt. The adhesive is solid at room temperature and is applied in a molten form. It is necessary that the adhesive remains homogenous for a period of time in the molten state.

A variety of available thermoplastic materials can be used in the adhesive materials. They are selected from thermoplastic polyesters, polyacrylates, polyolefins, polyurethanes, ethylene vinylacetate polymers (EVA), polystyrene copolymers or mixtures. Preferably these polymers are non-reactive. Examples of such thermoplastic polymers are elastic polymers, such as styrene block copolymers, like SIS, SBS, SEBS, SEPS, SIBS; ethylene/vinyl acetate polymers (EVA) and other ethylene copolymers, like ethylene/methacrylate, ethylene/n-butyl acrylate and ethylene/acrylic acid polymers; polyolefins, such as polyethylene, polypropylene and copolymers, amorphous poly-a-olefines (APAO); polyvinyl acetate and copolymers; poly(meth)acrylates from different acrylic monomers, for example alkyl(meth)acrylates, hydroxyalkyl(meth)acrylates, acrylamides; polyesters; polyvinyl alcohols; polyurethanes; copolymers of vinyl monomers and polyalkylene oxide.

Such polymers are commercially available in different compositions and molecular weights. The man skilled in the art can easily select useful thermoplastic polymers according to their melting point, viscosity or adhesive properties in accordance to the required purpose of the adhesive.

Such PSA material shall contain additionally a tackifying resin in combination with a thermoplastic polymer and optionally a plasticizer and other components.

Tackifying resins useful in the adhesive materials of the invention comprise natural and modified resins, polyterpene resins, phenol-modified hydrocarbon resins, aliphatic and aromatic hydrocarbon resins, hydrogenated hydrocarbons, hydrogenated resins and hydrogenated resin esters and rosins.

Examples for rosins and its derivatives include wood rosin, tall oil, colophonium, gum rosin, wood rosin, rosin ester resins including its esters, hydrogenated or dehydrogenated forms; terpene resins include for example natural and synthetic terpenes, polyterpenes and terpenesters; aromatic or mixed aliphatic-aromatic tackifying resins, like polymers from cyclopentadiene, dicyclopentadiene; styrene resins, like copolymers from styrene, alphamethyl styrene, vinyl toluene, methoxy styrene, tertiary butyl styrene, chlorostyrene; aliphatic resins from monomers 1,3-butadiene, cis-1,3-pentadiene, trans-1,3-pentadiene, 2-methyl-1,3-butadiene, 2-methyl-2-butene and other co-polymerisable monomers or aliphatic petroleum hydrocarbon resins.

It is preferred if the tackifying resins have a softening point from about 80° C. to 150° C. (ring and ball method, measured by ASTM E28-58). The adhesive composition comprises an amount of such resin between 10 to 60% by weight (related to the adhesive material of the core).

Additionally a plasticizer can be added to the PSA. The plasticizer is preferably used for viscosity adjustment and is comprised in the adhesive material in an amount of 0 to 25 wt.-%, preferably 5 to 20 wt.-%. Suitable plasticizers are medicinal white oils, naphthenic mineral oils, phthalates, adipates, polypropylene, polybutene, polyisoprene oligomers, hydrogenated polyisoprene and/or polybutadiene oligomers, benzoate esters, vegetable or animal oils and derivatives thereof.

Examples of plasticizer include hydrogenated plasticizers like oils or oligomers of polybutene. Also monohydric or polyhydric alcohols with a molecular weight of 1000 to 6000 g/mol may also be used, for example polyalkylene glycols. Another group of suitable plasticisers are esters, including, for example, liquid polyesters and glycerol esters, such as glycerol diacetate and glycerol triacetate as well as neopentyl glycol dibenzoate, glyceryl tribenzoate, pentaerythritol tetrabenzoate and 1,4-cyclohexanedimethanol dibenzoate. Also plasticizers based on aromatic dicarboxylic acid esters can be used, for example the esters of phthalic acid, isophthalic acid or terephthalic acid. Also esters of sulfonic acids are used as plasticiser. Fatty acids are also suitable plasticizers. Such components are commercially available.

Optionally waxes in quantities of 0 to 20 wt.-% by weight can be added to the PSA. The quantity is selected so that, on the one hand, the viscosity is reduced to the required range and, on the other hand, adhesion is not adversely affected. The wax may be of natural or synthetic origin. Suitable natural waxes are vegetable waxes, animal waxes, mineral waxes or petrochemical waxes. Suitable chemically modified waxes are hard waxes, such as montan ester waxes, sarsol waxes, etc. Suitable synthetic waxes are polyalkylene waxes and polyethylene glycol waxes. Preferred waxes are petrochemical waxes, such as petrolatum, microwaxes and synthetic waxes, particularly polyethylene waxes, polypropylene waxes, optionally PE or PP copolymers, Fischer-Tropsch resins, paraffin waxes or microcrystalline waxes.

In addition other typical auxiliaries and additives can be incorporated in a suitable PSA material. Examples are stabilizers, antioxidants, light stabilizers and/or adhesion promotors. Their function is to protect the polymers against decomposition during processing, storage or use. The stabilizers, more particularly UV stabilizers or antioxidants suitable for use include phosphites, phenols, sterically hindered phenols of high molecular weight, polyfunctional phenols, sulfur- and phosphorus-containing phenols. Suitable compounds in the context of the invention are, for example, hydroquinone, hydroquinone methyl ether or phenothiazine. The selection and the properties are known to the person skilled in the art. They are added to the adhesive material in quantities of typically up to 3 wt.-% and preferably about 0.1 to 2 wt.-%. The adhesive compositions can additionally contain other compatible polymers, fillers, pigments, dyes, oils, fragrances and other conventional additives.

PSA type hot melt adhesives are generally known to a man skilled in the art for example based on styrene block copolymers as disclosed in EP 0451920 or EP 1493794, acrylate type adhesives according to WO 02/010307, polyolefin type adhesives according to DE 19944225, EVA type adhesives disclosed in DE 102006054196. Such PSA materials shall have a softening point of about 80 to 150° C., preferably up to 130° C., in particular less than 120° C. Such type of PSA can be use as core material.

The outside shell of the pellets is made by a film forming material comprising at least one thermoplastic elastomer, which is not tacky at ambient temperature at 25° C., preferably up to 45° C. The chemical composition of such film forming polymers can be similar to the polymers as mentioned above. But in contrast to the thermoplastic polymers of the PSA it is a requirement that the polymer shall not possess tacky properties. Such polymers can be selected according to their molecular weight, their glass transition temperature or their chemical composition. As mentioned above the film forming polymer is selected from ethylene-based polymers, such as ethylene/vinyl acetate (EVA), ethylene acrylate, ethylene methacrylate, ethylene methyl acrylate, ethylene methyl methacrylate; high-density and low-density polyethylene; polyesters, such as polyethylene terephthalate, polybutylene terephthalate, thermoplastic polycarbonates; atactic poly-$\alpha$-olefins, including polypropylene, atactic polypropylene and others; polyurethanes; styrene/acrylonitrile, styrene/butadiene rubbers, polybutadiene rubber; polyacrylates. Preferably the polymers are different from the polymers of the PSA.

Examples of ethylene-based polymers are LDPE, VLDPE, LLDPE, MDPE obtained by ziegler natta catalyst polymerization, or LDPE, EVA, EAA, EMA, EBA obtained by gas phase random polymerization, or EO, EP, EB, EH, ESI copolymers, obtained by ziegler natta catalyst polymerization or single-site catalyst polymerization or metallocene catalyst polymerization. Examples of block copolymers including styrene-butadiene (SB), styrene-butadiene-styrene (SBS), styrene-isoprene-styrene (SIS), styrene-isoprene (SI), styrene-ethylene-butylene-styrene (SEBS), styrene-ethylene-butylene (SEB) styrene-ethylene propylene-styrene (SEPS) and styrene-ethylene propylene (SEP). The film forming polymer has a melting point of 70° C. to 130° C., preferably between 90 to 120° C. (measured by DSC).

The film forming material can include also other additives and auxiliaries preferably those which are required for processing of the material. One embodiment of the invention uses a film forming material which shall contain only small amounts of less than 20 wt-% (related to the film forming material), preferably less than 15 wt-%, of low molecular weight wax like materials. Another embodiment of the invention uses a film forming material which shall contain 1 to 15 wt-% (related to the film forming material) of at least one plasticiser. Preferably such plasticiser can be selected from hydrocarbon oils like paraffinic, naphthenic and/or mineral oils. This may enhance the process to homogenise adhesive and film polymer during melting and application of the adhesive.

The film forming material has a melting point of 70° C. to 130° C., less than 120° C.

The film forming material of the shell and the PSA of the core are compatible. So they shall form a homogenous mixture, which is stable as melt. In one specific embodiment of the invention the film forming material has a softening point which is equal or lower than the melting point of the adhesive material.

The film forming material is selected to form a coating or film having a non tacky surface and shall form a barrier against the environment. Prior to application of the pelletized adhesive the film forming material shall be blended with the adhesive material in molten form. This can be accelerated by mixing devices like static or dynamic mixers, by pumping or by the normal convection of the melting process. The blend is a homogenous PSA and shall be applied in molten form.

The shell of the pellets is made from a different composition including different polymers than the PSA material. The film shall have a thickness of about 2 to 200 µm, preferably 10 to 100 µm particularly more than 20 µm. This is dependent from the size of the pellets. If the amount of film forming material film is too large in relation to the amount of PSA, the properties of the adhesive will decrease. If the film does not cover to whole surface or is too thin, the stability of the flowing properties of the adhesive pellets is not ensured. The amount shall include up to 12 wt-% of film forming material, preferably about 1 to 10 wt-%, in particular more than 5 wt-% (related to the adhesive material). The outside shell shall have the form of a continuous coating. Such coating can be achieved by heating the film forming composition above the melting temperature. This can be performed by application of a powdered material being heated after coating above the melting temperature of the coating or preferably by co-extrusion and application of the film forming material as melt.

The hot melt PSA according to the invention shall be provided in form of pellets or granulates, so that the material is free flowing. The pellets shall have a size of less than 25 mm in each direction, preferably less than 20 mm. The lower limit is more than 1 mm, preferably more than 3 mm. The shape of the pellets can be varied according to the manufacturing process. They can have the form of small pillows, preferably a spherical form like balls, or in another preferred embodiment they are of cylindrical shape. In such case the dimensions are different in each direction, for example in one direction 25 mm with a diameter of 2 to 10 mm. The form of the pellets is not required to be regular, e.g. a spherical form can be compressed or stretched, rods can be symmetrical or have a non regular form as long as the size of the granulates is not too large. The form will be influenced by the manufacturing process, for example the pellets are squeezed, cut and separated to give a partly round form. It is possible but not preferred to mix different forms and sizes of the pellets. Another aspect of the invention is related to the size of the pellets. Typically the pellets shall have a weight of less than 15 g each, preferably less than 10 g most preferred less than 5 g. Smaller particle size increases the flowing properties of the material. The pellets shall be completely covered by the film. It is necessary that all sides of the pellets are covered otherwise the stability of the non blocking behaviour is reduced.

The pellets according to the invention show free flowing properties at a temperature up to 45° C. This free flowing property shall remain stable also after storage at elevated temperature. This stability can be tested according to the following method. A 10 cm wide tube with plastic or metal walls is filled with the pellets up to a height of 10 cm. On top of the material a plate with a 500-gram weight is placed. The test device is then placed in a 35° C. oven for 7 days. After this period the coated pellets were tested. They are removed from the oven, cooled to room temperature (about 20° C.) and poured in the testing device for flowing properties.

A preferred method to manufacture such pellets is the co-extrusion process. In a co-extrusion process, the plastic material to be packaged is melt blended in a mixer and then squeezed or extruded through an appropriately sized orifice in a die while still at a temperature above or very close to the softening point of the material. The orifice and die may be of any conventional configuration and generally is such as to provide either a slot like or cylindrical like configuration for the adhesive composition as it is pumped through the orifice. The temperature of the die must be maintained above the melting point of the composition, and is typically in the range of 100° C. to 150° C. In co-extrusion the polymeric film forming material of the coating is then simultaneously extruded from the die to surround the PSA to be packaged and thus forms an outer shell which surrounds completely the adhesive to be packaged. Co-extrusion techniques are well known in the art, and suitable equipment for co-extrusion processes are known to a person skilled in the art.

As known, since the materials being extruded at elevated temperatures, the co-extrusion process typically occurs under water or is immediately immersed to water so that the plastic material and film that surrounds the material begins to cool immediately after being extruded from the die. Thereafter, the plastic material covered by the polymeric film is allowed to cool either in a water bath or in a refrigerant medium such as chilled glycol, liquid nitrogen, compressed carbon dioxide or the like, or under ambient conditions so that the wrapped adhesive is sufficiently cooled for handling. The coated adhesive will be pinched mechanically preferably after cooling to a more solid form into pellets of desired size, shape, or weight. By this process it is essential, that the separating step also covers the cut section of the granulate particles completely with a coat. Accordingly the temperature of the pellet at this step has to be selected so that the coated film can still be stretched and cover the whole surface. Otherwise a long term stability of the flowing properties of the pellets is not secured. In a another embodiment of the invention it is possible to manufacture the pellets by a co-extrusion process where by the softening point of the film material is less or equal to the softening point of the adhesive.

The pellets may be further packaged after cooling in a container, box or bag for transportation. The container can be made of mechanically stable material so that large amounts of such pellets can be handled.

Another aspect of the invention is to provide a process to supply a granulated pressure sensitive adhesive as disclosed above to a melting device, the PSA granulate being covered with a non-tacky continuous coating. The PSA can be supplied as granulate in bulk form, e.g. as container or as big bag. The content of the container can be discharged by known means on the processing site. After discharging the pellets it can be transported by the known devices, e.g. screws, belt conveyors and other systems. Preferably the pellets can be transported by pressurised gas e.g. air or by vacuum for example in a vacuum feeder system. In such processing mechanical friction is provided to the surface of the pellets. So the transport of the pellets according to the invention is possible without clogging in the transportation system and sticking of the pellets.

Another aspect of the invention is the use of such pellets of PSA which are covered by a non-blocking continuous film in automated supply operations of an application device. The pellets of the hot melt adhesive can be manufactured preferably by co-extrusion process. The pellets are non sticky and free flowing and can be handled for further processing on belts, screws or pipes. They can be stored and transported in large packaging containers like bags, drums or tanks. During further processing at the customer's site a portion of the materials can be discharged from the packaging container and transported to the melting device. This transportation can be performed by known devices preferably by a vacuum feeder. In the melting tank the material is molten and then it can be pumped to the application devices for example nozzles or rolls.

As the pellets have a small volume for each particle, it is possible to feed the adhesive in smaller portions to the melting device. So the amount of PSA to be processed in the melting tank can be reduced. An automatically operating feeder system is possible. No manual feeding of the melting tank is required. The amount of adhesive can be easily metered by known methods and devices.

As only low amounts of pellets are fed in the melting tank, the melting process can be accelerated. The stock of molten material can be reduced. A degradation process of the adhesive during melting can be reduced.

The advantages of the adhesives pellets according to the invention are the free flowing properties which allow a highly automated processing of the pellets. Another advantage is the improved storage stability of the pellets also at elevated temperature. So the PSA can be supplied to a customer in a bulk form. Additionally the handling of the adhesive is improved to allow transportation in a vacuum feeder or by pressurized air. The adhesive can be supplied in small portions a will be subject to less degradation in the melting and application process.

The invention claimed is:

1. A process for forming a plurality of hot melt pressure sensitive adhesive pellets comprising the steps of:
    (a) melting a core of a pressure sensitive adhesive material that consists of (i) a core polymer selected from polyester, polyacrylate, polyolefin, polyurethane, ethylene vinyl acetate polymers, styrene block copolymers or mixtures thereof, (ii) a tackifier; (iii) 5 to 20 wt %, based on the total weight of the core, of a plasticizer, (iv) up to 20 wt %, based on the total weight of the core, of a wax, and (v) less than 3 wt %, based on the total weight of the core, of a stabilizer, antioxidant, light stabilizer, adhesive promoter, compatible polymer, fragrance, or any combination thereof, wherein the pressure sensitive adhesive material has a softening, point of 80 to 150° C. and has, a tacky surface at 25° C.;
    (b) extruding the core at a temperature in the range of 100° C. to 150° C. to form an extruded core;
    (c) co-extruding a polymeric film to surround the extruded core within a continuous outer shell of the polymeric film to form an adhesive, wherein the film comprises (i) a thermoplastic polymer with a melting point of 90° C. to 120° C. selected from the group consisting of ethylene/vinyl acetate, high-density polyethylene, low-density polyethylene, atactic poly-a-olefin, polyurethane, styrene/acrylonitrile, styrene/butadiene rubber and polybutadiene rubber, wherein the thermoplastic polymer is different from the core polymer and is not tacky at 25° C., (ii) less than 20 wt % wax, and (iii) 1 to 15 wt % of a plasticizer, based on the total weight of the polymeric film, wherein the softening point of the polymeric film is less than the softening point of the core;
(d) cooling the adhesive; and
(e) pinching the adhesive to a form a plurality of pellets at a temperature where the polymeric film is stretched and covers the surface of the core,
wherein the adhesive pellets are non-blocking and free-flowing during storage and transportation,
wherein the core and the polymeric film are compatible to form a homogeneous mixture in a molten state.

2. The process for forming a plurality of hot melt pressure sensitive adhesive pellets according to claim 1, wherein steps (b) and (c) are performed in water.

3. The process for forming a plurality of hot melt pressure sensitive adhesive pellets according to claim 1, wherein the cooling, the adhesive is conducted in water.

4. The process for forming a plurality of hot melt pressure sensitive adhesive pellets according to claim 1, wherein the cooling the adhesive is conducted in a refrigerant medium selected from chilled glycol, liquid nitrogen or compressed carbon dioxide.

5. The process for forming a plurality of hot melt pressure sensitive adhesive pellets according to claim 1, wherein the core polymer does not comprise an ethylene vinyl acetate polymer.

* * * * *